United States Patent

Clark

[15] 3,644,752
[45] Feb. 22, 1972

[54] ANALOG OUTPUT CIRCUIT
[72] Inventor: Vernon R. Clark, Bartlesville, Okla.
[73] Assignee: Phillips Petroleum Company
[22] Filed: Jan. 8, 1971
[21] Appl. No.: 104,985

[52] U.S. Cl. .............................. 307/229, 307/235, 307/315
[51] Int. Cl. ...................................................... H03k 17/00
[58] Field of Search .................... 307/229, 230, 365, 235; 328/142; 330/30 D

[56] References Cited

UNITED STATES PATENTS 3,552,428   1/1971   Pemberton ........................ 307/229 X Primary Examiner—Stanley D. Miller, Jr.
Assistant Examiner—B. P. Davis
Attorney—Young and Quigg

[57] ABSTRACT

A circuit to establish an output current proportional to an input signal comprises an input summing amplifier, having the output signal therefrom applied to a current amplifier. A resistor and a bridge rectifier assembly are connected in the output circuit of the current amplifier. A differential feedback amplifier applies an amplified signal, representative of the potential drop across the resistor, to the input of the summing amplifier.

4 Claims, 1 Drawing Figure

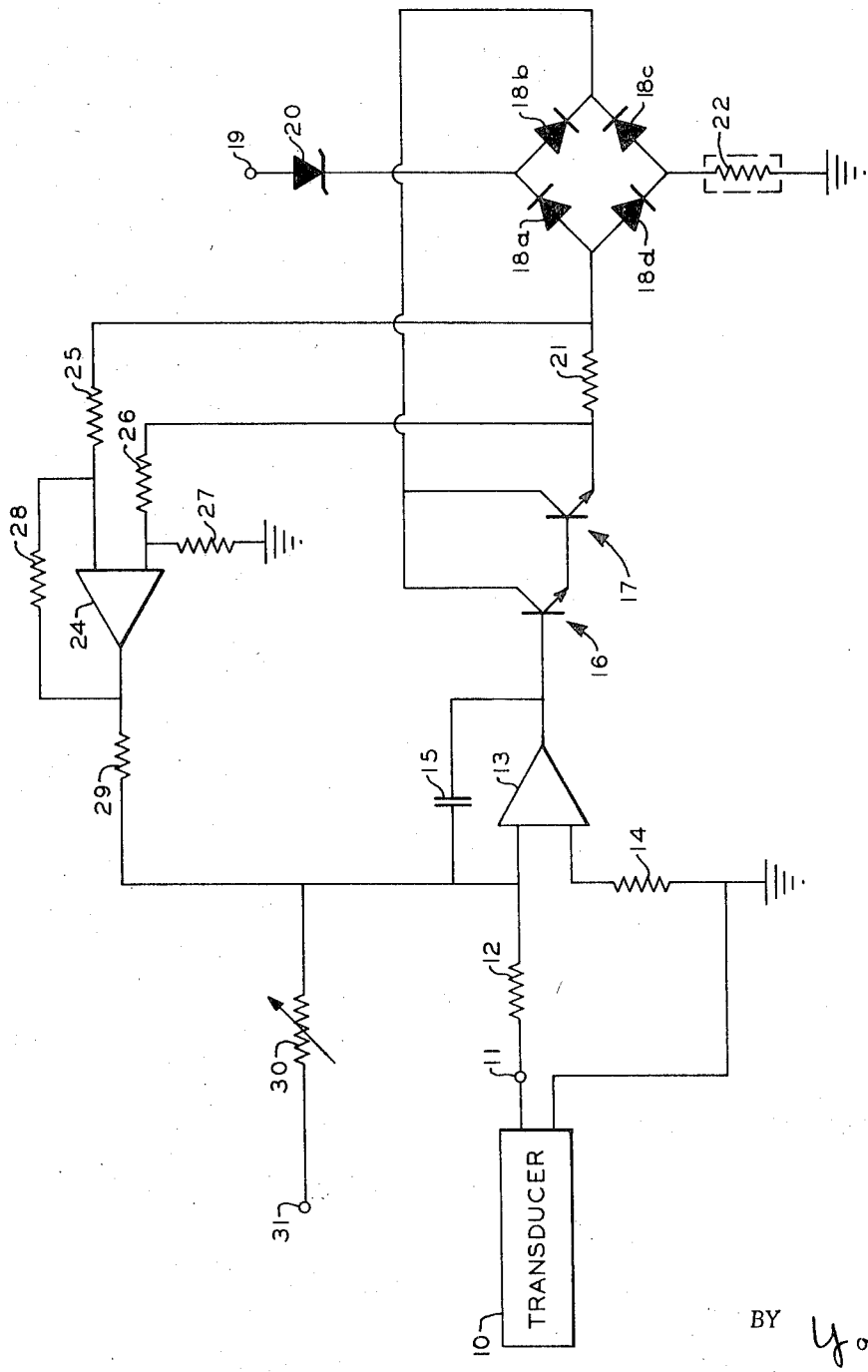

ANALOG OUTPUT CIRCUIT

In various types of electrical measuring and control systems there is a need to establish an output current which is proportional to a measured or computed signal. For example, an automatic process control system may utilize a digital computer to calculate the desired setting of a process variable. The digital output signal from the computer is converted to a corresponding analog signal which is capable of being received by a conventional control instrument. However, the output signal from the converter usually is an extremely small current so that amplification is necessary in order to be utilized by the control instrument. Since control instruments of various configurations may be employed in plant operations, it is desirable to provide current amplifying apparatus which is capable of establishing output control signals which can be received by different types of control instruments.

In accordance with this invention, a current amplification system suitable for us in a number of applications is provided. This system comprises a first amplifier which receives the input signal. The output of this first amplifier is applied to the input of a current amplifier, which advantageously comprises a pair of transistors connected as a Darlington amplifier. A resistor and a bridge rectifier assembly are connected in the output circuit of the current amplifier. A voltage source is connected to one terminal of the rectifier assembly, and an opposite terminal is adapted to be connected to an external resistive load. The end terminals of the resistor in the output circuit of the current amplifier are connected to the respective input terminals of a differential amplifier. The output of the differential amplifier is connected to the input of the first amplifier to provide a feedback signal to stabilize the operation of the circuit. The range of the output current can be adjusted by regulating the value of the resistor in the output circuit.

The accompanying drawing is a schematic circuit illustration of an embodiment of the apparatus of this invention.

Referring now to the drawing in detail, there is shown a transducer 10 having a first output terminal connected to an input terminal 11 of the apparatus of this invention. The second output terminal of transducer 10 is connected to ground. This transducer can be representative of various types of measurement, control or computing elements which establish an output signal. For example, transducer 10 can represent apparatus to measure process variables such as temperature, pressure, flow rates or the like. In a control system utilizing a digital computer, transducer 10 can represent a digital-to-analog converter which is connected to the output of a digital converter to establish an analog control signal. In any event, the output signal from transducer 10 is a voltage of small amplitude.

Terminal 11 is connected by a resistor 12 to the first input terminal of an amplifier 13. A resistor 14 is connected between the second input terminal of amplifier 13 and ground. Amplifier 13 is provided with a feedback capacitor 15. The output of amplifier 13 is connected to the base of a first transistor 16. The emitter of transistor 16 is connected to the base of a second transistor 17. The collectors of transistors 16 and 17 are connected to one another to form a Darlington amplifier.

The output circuit of the two transistors includes a bridge rectifier network 18 having four rectifiers 18a, 18b, 18c and 18d connected therein. Voltage from an external source, not shown, is supplied to the first terminal of network 18 from an input terminal 19. A Zener diode 20 can be connected between terminal 19 and network 18. A resistor 21 is connected between the emitter of transistor 17 and the second terminal of network 18. The third terminal of network 18 is connected to the collectors of transistors 16 and 17. The fourth terminal of network 18 is connected to ground through an external load resistor 22, which can represent a control or measuring instrument, for example.

The illustrated circuit is provided with a differential feedback amplifier 24. An input resistor 25 is connected between one terminal of resistor 21 and the first input terminal of amplifier 24. An input resistor 26 is connected between the second terminal of resistor 21 and the second input terminal of amplifier 24. A resistor 27 is connected between the second input terminal of amplifier 24 and ground. Amplifier 24 is provided with a feedback resistor 28. The output of amplifier 24 is connected by a resistor 29 to the first input terminal of amplifier 13.

With the Zener diode 20, either the positive or the negative terminal of a voltage source can be applied to terminal 19, depending on the desired direction of current flow through load resistor 22. If a positive potential is applied, current flows from terminal 19 through rectifier 18b, transistors 16 and 17, resistor 21 and rectifier 18d to external load resistor 22. If a negative potential is applied to terminal 19, current flows from external load 22 through rectifier 18c, transistors 16 and 17, resistor 21 and rectifier 18a to terminal 19. It is desirable to employ Zener diode 20 when a negative potential is employed at terminal 19 in order to reduce the common mode voltage applied to the differential amplifier 24 below its supply voltages.

Amplifier 13 functions as a summing amplifier. The two transistors 16 and 17 provide substantial current amplification of the input signal from amplifier 13. Amplifier 24 functions as a differential amplifier to provide a feedback signal representative of the voltage drop across resistor 21. In one specific embodiment of this invention, amplifiers 13 and 24 were conventional high gain operational amplifiers. Resistors 25 and 26 were 10,000 ohms each, and resistors 27 and 28 were 100,000 ohms each. Resistor 12, which can be variable, ranged from 10,000 to 15,000 ohms. Resistor 29 was 18,000 ohms. Resistor 21 is normally a precision resistor to provide a voltage drop which is directly proportional to the current flow therethrough. The value of resistor 21 serves to vary the range of the current flow through load resistor 22. For example, if a potential of 15 volts is applied to terminal 19, a sensing resistor 21 of 50 ohms can provide an output current in the range of 4 to 20 milliamps. A sensing resistor of 20 ohms can provide an output current of 10 to 50 milliamps, for example. Of course, other voltages can be applied to terminal 19.

In some operations, it is desirable to provide a reference zero point signal to the circuit. This can be accomplished by connecting a variable resistor 30 between a reference potential terminal 31 and the first input of amplifier 13. By adjusting the amplitude of the signal applied through resistor 30, a reference zero point can be established.

While this invention has been described in conjunction with a presently preferred embodiment, it obviously is not limited thereto.

What is claimed is:

1. Apparatus to receive an input signal and provide an output current proportional thereto, comprising:
    a summing amplifier adapted to receive an input signal;
    a current amplifier having the input thereof connected to the output of said summing amplifier;
    a rectifier network comprising first, second, third and fourth terminals, a first rectifier connected to pass current from said first terminal to said third terminal, a second rectifier connected to pass current from said fourth terminal to said third terminal, a third rectifier connected to pass current from said second terminal to said fourth terminal, and a fourth rectifier connected to pass current from said second terminal to said first terminal;
    a resistor;
    circuit means connecting said resistor and said second and third terminals in the output circuit of said current amplifier;
    a differential amplifier having the inputs thereof connected across said resistor and the output thereof connected to the input of said summing amplifier; and
    means to apply a source of current to said first terminal, said fourth terminal representing the output of said apparatus.

2. The apparatus of claim 1 wherein said means to apply a source of current to said first terminal includes a Zener diode.

3. The apparatus of claim 1, further comprising means to apply a reference voltage to the input of said summing amplifier.

4. The apparatus of claim 1 wherein said current amplifier comprises first and second transistors, each having a base, a collector and an emitter, the base of said first transistor representing the input of said current amplifier; means connecting the collector of said first transistor to the collector of said second transistor; and means connecting the emitter of said first transistor to the base of said second transistor, the output circuit of said current amplifier being between the emitter and the collector of said second transistor.

* * * * *